(12) United States Patent
Aviv

(10) Patent No.: US 12,301,263 B2
(45) Date of Patent: May 13, 2025

(54) SELF-CONTROLLED RADIO FREQUENCY (RF) FILTERING UNIT

(71) Applicant: D-FEND SOLUTIONS AD LTD., Raanana (IL)

(72) Inventor: Shmuel Aviv, Raanana (IL)

(73) Assignee: D-FEND SOLUTIONS AD LTD., Raanana (IL)

( * ) Notice: Subject to any disclaimer, the term of this patent is extended or adjusted under 35 U.S.C. 154(b) by 416 days.

(21) Appl. No.: 17/806,074

(22) Filed: Jun. 8, 2022

(65) Prior Publication Data
US 2023/0163792 A1 May 25, 2023

(30) Foreign Application Priority Data
Nov. 19, 2021 (IL) .......................................... 288247

(51) Int. Cl.
*H03H 7/12* (2006.01)
*H01Q 5/335* (2015.01)
*H04B 1/00* (2006.01)

(52) U.S. Cl.
CPC .............. *H04B 1/006* (2013.01); *H01Q 5/335* (2015.01)

(58) Field of Classification Search
CPC .......... H03H 7/12; H03H 7/01; H03H 7/0138; H03H 7/0135; H03H 9/46; H03H 9/462;
(Continued)

(56) References Cited

U.S. PATENT DOCUMENTS 10,979,021 B2 * 4/2021 Pfann ..................... H03H 9/584
2006/0017525 A1 1/2006 Goyette
(Continued)

*Primary Examiner* — Hai L Nguyen
(74) *Attorney, Agent, or Firm* — Reches Patents

(57) ABSTRACT

A self-controlled radio frequency (RF) filtering unit that may include (i) a frequency bank that comprises first till fourth band pass filters (BPFs) having first till fourth frequency bands respectively; wherein at least one harmonic of at least one fundamental frequency within the first frequency band pass an interference risk for at least one other frequency band; (ii) a measurement circuit configured to measure the input power received in two or more frequency bands and to provide a power measurement result; (ii) an input RF switch comprising a first RF switch input port, a first RF switch output port, and a second RF switch output port; wherein input RF switch is configured to select a selected RF switch output port, based at least in part on the power measurement result, out of the first and second RF switch output ports; wherein the first RF switch output port is RF coupled to an input of the second BPF; wherein the second RF switch output port is RF coupled to inputs of the first BPF, the third BPF and the fourth BPF; and (ii) an output RF switch comprising a second RF switch input port, a third RF switch input port, and a third RF switch output port; wherein output RF switch is configured to select, based at least in part on the power measurement result, a selected RF switch input port out of the second and third RF switch input ports; wherein the second RF switch input port is RF coupled to outputs of the first BPF and the second BPF; and wherein the third RF switch input port is RF coupled to outputs of the third BPF and the fourth BPF.

28 Claims, 3 Drawing Sheets

(58) Field of Classification Search
CPC .......... H03H 9/465; H03H 9/48; H03H 9/485;
H03H 9/52; H03H 9/525; H04B 1/006;
H04B 1/0057; H04B 1/005; H04B 1/0053
USPC ................ 333/165, 172, 178, 181, 185, 186
See application file for complete search history.

(56) References Cited

U.S. PATENT DOCUMENTS

| | | |
|---|---|---|
| 2010/0203879 A1 | 8/2010 | Toncich et al. |
| 2016/0112072 A1 | 4/2016 | Bauder |
| 2019/0181907 A1 | 6/2019 | Pfann et al. |
| 2020/0014362 A1 | 1/2020 | Zhang et al. |

\* cited by examiner

SELF-CONTROLLED RADIO FREQUENCY (RF) FILTERING UNIT

BACKGROUND OF THE INVENTION

The federal communication commission (FCC) and other regulatory entities impose strict restrictions on RF emissions. These restrictions may limit the RF emission outside certain frequency bands—including strict restriction of spurious and harmonics.

The restriction of harmonics may be highly complicated when some frequency bands include fundamental frequencies having harmonics that may interfere with other frequency bands.

An RF filtering unit is required to suppress unwanted signals with minimal impact on the wanted signals, have a minimal response time (for example less than 10 microseconds) to signals that may be provided from an asynchronous system.

The RF filtering unit is required to pass desired RF signals of multiple allowable frequency bands, without using an external synchronization or control trigger, branch each RF signal to the correct RF filter—which may be very challenging when the RF signals may be of a variable power, a variable frequency, and of different modulation methods.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
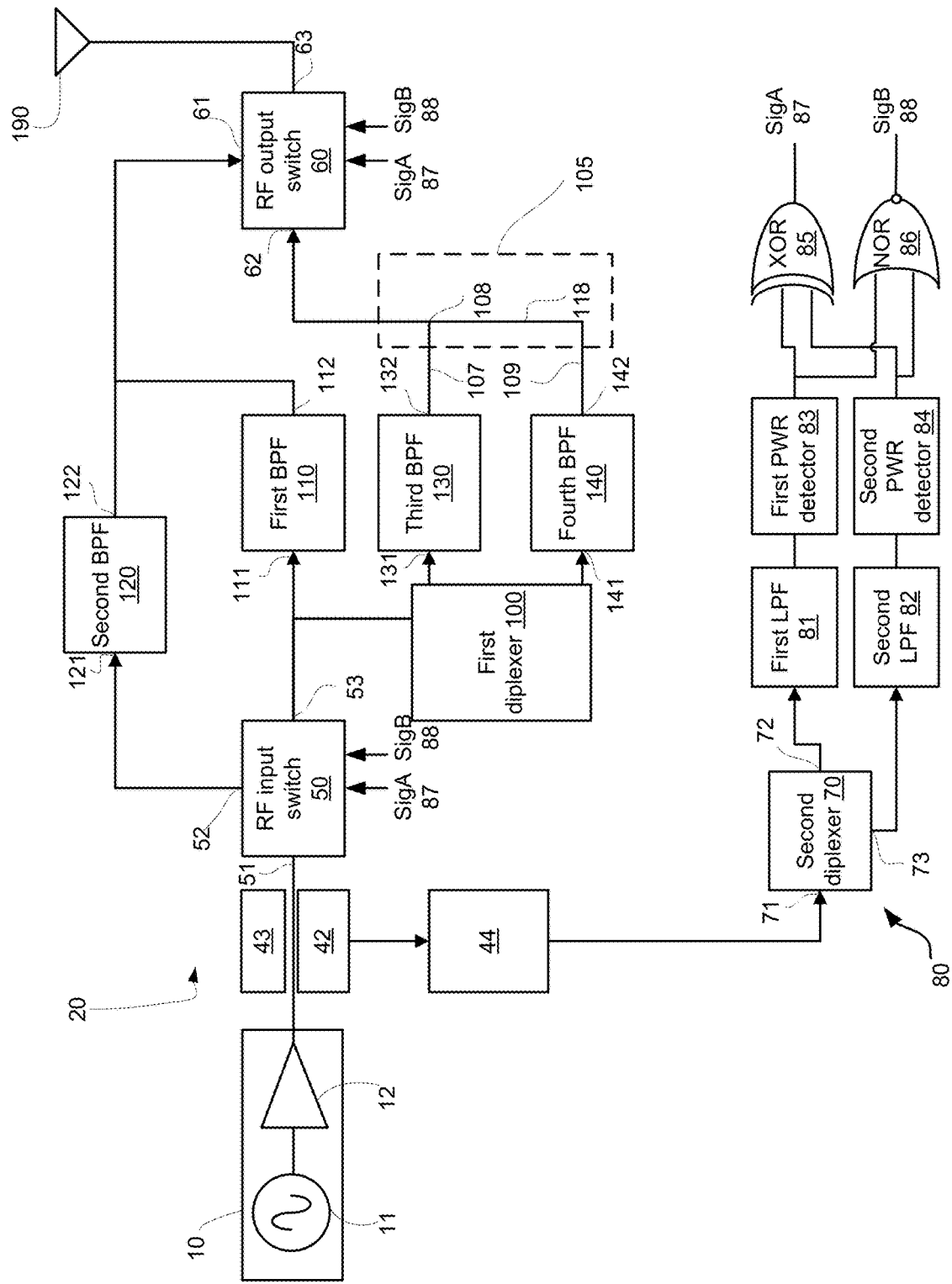
FIG. 1 illustrates an example of a self-controlled radio frequency RF filtering unit.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

FIG. 1 illustrates an example of a self-controlled radio frequency RF filtering unit 20. FIG. 1 also illustrates a source 10 of an input RF signal received by the self-controlled radio frequency RF filtering unit 20. The source 10 is not a part of the self-controlled radio frequency RF filtering unit 20 and is illustrated as including an RF signal generator 11 followed by an amplifier 12.

The self-controlled RF filtering unit 20 includes first till fourth band pass filters BPFs 110, 120, 130, 140 having first till fourth frequency bands respectively, an input RF switch 50 and an output RF switch 60.

Referring to the frequency bank—at least one harmonic of at least one fundamental frequency within the first frequency band pass an interference risk for at least one other frequency band.

An interference risk may be imposed when a harmonic of a fundamental frequency within one frequency band pass is within another frequency band.

An interference risk may be imposed when a harmonic of a fundamental frequency within one frequency band pass is outside another frequency band—but is not attenuated enough by the band pass filter of the other frequency band. What amount to "enough" may be defined in any manner—for example not according to a predefined specification, standard or any other threshold.

It is assumed, for simplicity of explanation, that the first frequency band ranges between about 430 and about 460 MHz, the second frequency band ranges between about 910 and about 930 MHz, the third frequency band ranges between about 2404 and about 2480 MHz, and the fourth frequency band ranges between about 5725 and about 5850 MHz.

The term "about" means that a certain deviation may be allowed—for example up to 1, 2, 3 percent and the like of deviation is allowed.

One of the standards (FCC 15.223) requirements is to withstand signal rejection of the system transmitting up to 5 times the highest frequency in the system (max 20 GHz).

| Band | Second harmonics (MHz) | Third Harmonic (MHz) | Fourth Harmony (MHz) | Fifth Harmony (MHz) |
|---|---|---|---|---|
| 430~460.125 | 860~920.250 (In band of 900) | 1290~1380.375 | 1720~1840 | 2150~2300 |

-continued

| Band | Second harmonics (MHz) | Third Harmonic (MHz) | Fourth Harmony (MHz) | Fifth Harmony (MHz) |
|---|---|---|---|---|
| 910~930 | 1820~1860 | 2730~2790(very close to WIFI Bands) | 3640~3720 | 4550~4650 |
| 2402~2480 | 4804~4960 | 7206~7440 | 9608~9920 | 12010~12400 |
| 5725~5850 | 11450~11700 | 17175~17550 | NA | NA |

It can be seen that there is a risk of interference (due to harmonics) between multiple frequency bands.

The allocation of band pass filters to different output ports of the input RF switch contributes to the prevention of leakage (for example of harmonics)—as the second band filter (having a second frequency range of about 910 and about 930 MHz) is isolated (by the least the inter-port isolation provided by the input RF switch) from the first band pass filter (having one or more harmonic that may impose a risk of interfering with the second bank filter) and from the third and fourth band pass filters (that may be interfered by one or more harmonics within the second frequency band).

There difference between the mapping of the inputs of the band pass filters (inputs of the first, third and fourth band pass filters are RF coupled to one output of the input RF switch) and the mapping of the output of the band pass filters (outputs of the first and second band pass filters are RF coupled to one input of the output RF switch) further contributed to the isolation.

The isolation is also obtained by (a) RF coupling of the outputs of the first and second BPF together and to one input of the RF output switch, and the (b) RF coupling of the outputs of the third and fourth BPF together to a second input of the RF output switch. This results in connecting each BPF outlet to a nearby band while imposing negligible impedance loading—thereby minimizing inter-frequency band interference.

The self-controlled RF filtering unit 20 also includes a measurement circuit 80 configured to measure the input power received in two or more frequency bands—for example at the first frequency band and at the second frequency band, and to provide a power measurement result—for example a first frequency band power indicator 87 and a second frequency band power indicator 88. In FIG. 1 the measurement circuit 80 includes a second diplexer 70 having a second diplexer input 71 for receiving an input signal from coil 44, and two second diplexer outputs 72 and 73 respectively that output RF signals to first LPF 81 and second LPF 82 respectively. First power detector 83 receives an output signal of first LPF 81 and generates a first power indicator that is provided as input to XOR 85 and NOR 86. Second power detector 84 receives an output signal of second LPF 82 and generates a second power indicator that is provided as input to XOR 85 and NOR 86.

The input RF switch 50 includes a first RF switch input port 51, a first RF switch output port 52, and a second RF switch output port 53.

The input RF switch is configured to select a selected RF switch output port, based at least in part on the power measurement result, out of the first and second RF switch output ports.

An input signal may have a certain duration (for example 100 milliseconds)—and its amplitude may dramatically change over time—for example—by tens of dB. Due to the changes in amplitude—during the one or more parts of the input signal the measurement circuit may provide a power indicator related to the input signal while during one or more other parts of the input signal the measurement circuit may not provide a power indicator related to the input signal.

In order to prevent the input RF switch to change its state during the reception of such input signal there is a need to impose a delay between consecutive states of the input RF switch. The delay may be equal the entire expected duration of the input signal (for example 100 milliseconds) or may be a part of the duration. For example—if the amplitude of the input signal is expected to be lower than a power detection threshold of the measurement circuit during a certain period, then the delay should not be shorter than that certain period.

The first RF switch output port 52 is RF coupled to an input 121 of the second BPF 120.

The second RF switch output port 53 is RF coupled to inputs 111, 131, 141 of the first BPF 110, the third BPF 130 and the fourth BPF 140.

The output RF switch 60 may include a second RF switch input port 61, a third RF switch input port 62, and a third RF switch output port 63 that is coupled to antenna 190.

The output RF switch is configured to select, based at least in part on the power measurement result, a selected RF switch input port out of the second and third RF switch output ports.

The second RF switch input port 61 is RF coupled to outputs 112, 122 of the first BPF and the second BPF.

The third RF switch input port 62 is RF coupled to outputs 132, 142 of the third BPF and the fourth BPF.

The input RF switch is configured to maintaining a selection of the selected RF switch output port for a predefined period.

The predefined period may be substantially equal to at least a part of an expected duration of an input RF signal received by the input RF switch—for example at least 20, 30, 40, 50, 60, 70 percent of the duration of the input RF signal. This may be beneficial when the level of the input RF signal is expected to be below a predefined power threshold during that part of the expected duration of the input RF signal. For example—assuming a 100 millisecond signal—assuming that the signal is below a predefined power level for 30 milliseconds—and setting the predefined period to be 30 milliseconds will maintain the selection regardless the reduction of power for the 30 millisecond.

The input RF switch may have a default position—for example the default state may include selecting the second RF switch output. Accordingly—the input RF switch may be configured to: (a) select the first RF switch output port (when receiving a power measurement result indicative that there is no signal in the second frequency band), (b) maintain the selection of the first RF switch output port for the predefined period (for example—100 milliseconds), (c) receive a power measurement result indicative that there is no signal in first frequency band; and (d) return to select the second RF switch output port.

FIG. 1 also illustrates that the self-controlled RF filtering unit may include a frequency selective coupler that may include a coupling element 42 (which may differ from a directional coupler) that may be followed by a coil 44. The frequency selective coupler is RF coupled between the first RF switch input port and the measurement circuit 80.

The frequency selective coupler may be configured to block frequencies within at least the third and fourth frequency bands.

The frequency selective coupler may be configured to block frequencies above the second frequency band.

The frequency selective coupler may be configured to block frequencies above 1 GHz.

Using a coil instead of a directional coupler reduces the cost and the complexity of the self-controlled RF filtering unit. Measuring the power of the lower frequency bands also reduces the cost and complexity of the self-controlled RF filtering unit.

The self-controlled RF filtering unit may be without a directional coupler.

The self-controlled RF filtering unit may include a notch filter or a trap (denoted 43) for blocking a harmonic of one of the frequency bands (for example—blocking the second harmonic of the second frequency band) from reaching the input RF switch. For example—blocking the frequencies between 4804 and 4960 MHz.

FIG. 1 illustrates that the second RF switch output port may be RF coupled to inputs of the third BPF and the fourth BPF via a first diplexer 100.

FIG. 1 also illustrates that the third RF switch input port is RF coupled to outputs of the third BPF and the fourth BPF via a matching network 105 that consists essentially of RF transmission lines. The RF transmission lines may have the same resistance (for example 50 Ohms). The output ports of the BPF and the input ports of the output RF switch may have the same impedance (for example 50 Ohm).

The RF transmission lines may be a first RF transmission line 107 (for example a first microstrip) that is RF coupled to the output of the third BPF, a second RF transmission line 109 that is RF coupled to the output of the fourth BPF and a stub 118 that is coupled between the outputs of the first and second RF transmission lines 107 and 109. A junction 108 is formed at the point of coupling between the stub 118 and the output of the first RF transmission line 107.

The coupling of the outputs of the third and fourth BPF enable using a simple matching network.

The simple network is designed so that a filtered RF signal outputted from third BPF does not (or almost does not) reach the fourth BPF.

Figure 2:
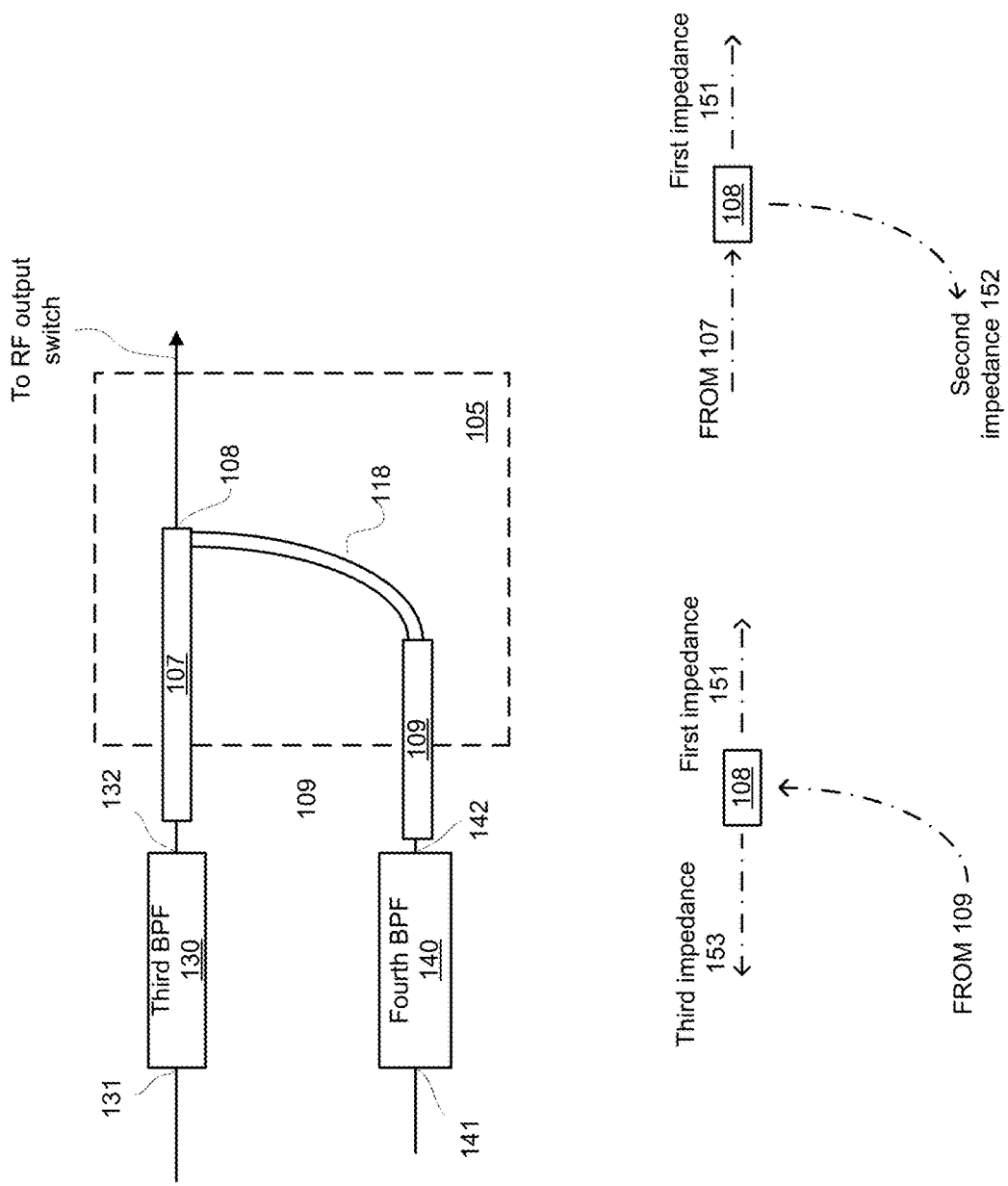
FIG. 2 illustrates some components of a self-controlled radio frequency RF filtering unit.

As illustrates in FIG. 2—when reaching junction 108—the filtered RF signal outputted from third BPF "sees" a very low (even zero ohm) first impedance 151 towards the output RF filter, and "sees" a very high second impedance 152 towards the output of the fourth BPF—and propagates towards the output RF filter.

The simple network is designed so that a filtered RF signal outputted from the fourth BPF does not (or almost does not) reach the third BPF.

As illustrates in FIG. 2—when reaching junction 108—the filtered RF signal outputted from fourth BPF "sees" a very low (even zero ohm) first impedance 151 towards the output RF filter, and "sees" a very high third impedance 155 towards the output of the third BPF—and propagates towards the output RF filter.

The mentioned above self-controlled RF filtering unit has a minimal number of components, is compact and achieved the following:
a. Low Insertion loss for each band <2.5 dB
b. High rejection for each band >45 dB
c. No external control input, only input power (RF signal)
d. Low power consumption: 56 mA/5V
e. High dynamic range (RF Signal)
f. Ultra-low Latency time.
g. Very fast hopping between the channels.
h. Small form factor.
i. Manage vary wide range of modulation methods, including a digital modulation which has a high linearity The a self-controlled radio frequency RF filtering unit may be compact—for example may be included within a compact housing—for example a cylindrical housing of length 70 mm and a diameter of 40 mm. Other dimensions and shaped may be provided.

Figure 3:
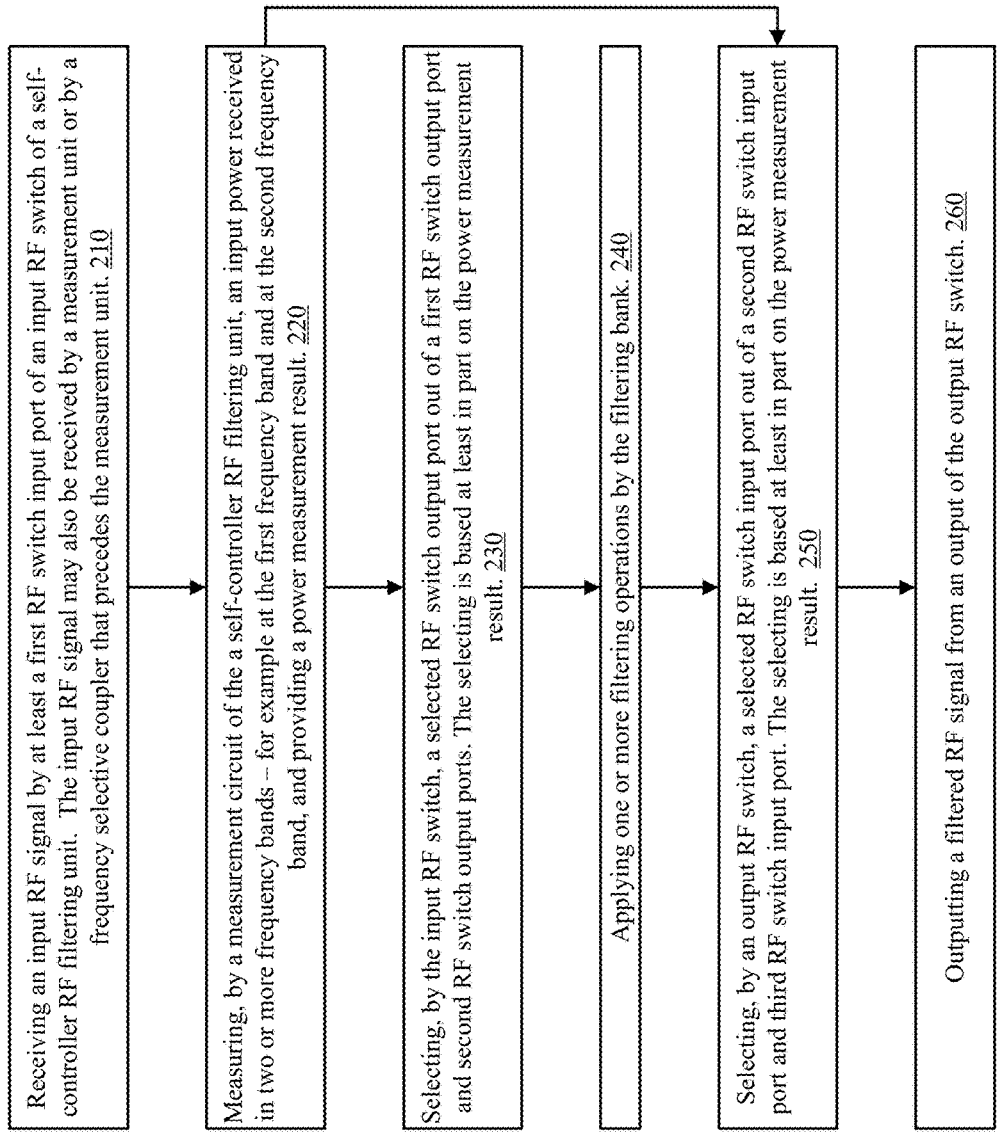
FIG. 3 illustrates an example of a method.

FIG. 3 is an example of a method 100 for self-controlled radio frequency (RF) filtering.

Method 200 may be executed by the self-controller RF filtering unit of FIG. 1.

Method 200 may start by step 210 of receiving an input RF signal by at least a first RF switch input port of an input RF switch of a self-controller RF filtering unit. The input RF signal may also be received by a measurement unit or by a frequency selective coupler that precedes the measurement unit.

The self-controller RF filtering unit may include a frequency bank that may include first till fourth band pass filters (BPFs) having first till fourth frequency bands respectively. At least one harmonic of at least one fundamental frequency within the first frequency band pass an interference risk for at least one other frequency band.

It is assumed, for simplicity of explanation that (a) the first frequency band ranges between 430 and 460 MHz, (b) the second frequency band ranges between about 910 and about 930 MHz, (c) the third frequency band ranges between about 2404 and about 2480 MHz, and (d) the fourth frequency band ranges between about 5725 and about 5850 MHz.

The frequency selective coupler may perform (and the method may include) performing frequency selective coupling to the measurement circuit.

The performing of the frequency selective coupling may include at least one of the following: (a) blocking frequencies within at least the third and frequency bands, (b) blocking frequencies above the second frequency band, (c) blocking frequencies above 1 GHz, or (d) performing of the frequency selective coupling is performed using a frequency selective coupler that comprises a coil.

Step 210 may be followed by step 220 of measuring, by a measurement circuit of the a self-controller RF filtering unit, an input power received in two or more frequency bands—for example at the first frequency band and at the second frequency band, and providing a power measurement result. This may include providing indication of an existence of a signal within one or more frequency bands—for example the existence of a signal in the first frequency band and/or the existence of a signal in the second frequency band—whether the input RF signal is of the first frequency band or is of the second frequency band.

The power measurement result is provided to the input RF switch and the output RF switch.

Step 220 is followed by step 230 of selecting, by the input RF switch, a selected RF switch output port out of a first RF switch output port and second RF switch output ports. The selecting is based at least in part on the power measurement result.

The first RF switch output port is RF coupled to an input of the second BPF2. The second RF switch output port is RF coupled to inputs of the first BPF, the third BPF and the fourth BPF.

If, for example, the power measurement result indicates that the input RF signal is of the second frequency band then the selected RF switch output port is the first RF switch output port 52—then the input RF signal is relayed to the second BPF 120.

Else—the default state is maintained, and the selected RF switch output port is the second RF switch output port 53—and the input RF signal is relayed to the first, third and fourth BPFs 110, 130 and 140. In figure the input RF switch is provided to the third and fourth BPF via first diplexer 100.

Step 230 is followed by step 240 of applying one or more filtering operations by the filtering bank. The one or more filtering operations depend on the selection of step 230.

When selecting the first RF switch output port 52—the filtering operation is done by the second BPF 120. When selecting the second RF switch output port 53—the filtering operation is done by the first, third and fourth BPFs—or at least by the relevant BPF of the first, third and fourth BPFs. The non-relevant BBFs just reject (filter out) the signal.

Step 240 is followed by step 250 of selecting, by an output RF switch, a selected RF switch input port out of a second RF switch input port and third RF switch input port. The selecting is based at least in part on the power measurement result. The second RF switch input port is RF coupled to outputs of the first BPF and the second BPF. The third RF switch input port is RF coupled to outputs of the third BPF and the fourth BPF.

When step 220 selected the first RF switch output port 52 and step 250 selected the second RF switch input port—the output RF switch will receive and output an RF signal filtered by the second BPF.

When step 220 selected the second RF switch output port 53 and step 250 selected the second RF switch input port—the output RF switch will receive and output an RF signal filtered by the first BPF.

When step 220 selected the second RF switch output port 53 and step 250 selected the third RF switch input port—the output RF switch will receive and output an RF signal filtered by one of the third BPF and the fourth BPF.

The RF filtered signal from either one of the third BPF and the fourth BPF may propagate via a matching network. The third RF switch input port may be RF coupled to outputs of the third BPF and the fourth BPF via a matching network that consists essentially of RF transmission lines. The RF transmission lines may be (a) a first RF transmission line that is RF coupled to the output of the third BPF, and (b) a second RF transmission line that is RF coupled to the output of the fourth BPF.

In both steps 230 and 250—the selection may be maintained for a predefined period. The predefined period may substantially equal to at least a part of an expected duration of an input RF signal received by the input RF switch. The predefined period may substantially be equal to 100 milliseconds.

Multiple iterations of steps 230 and 250 may include (a) selecting the first RF switch output port, (b) maintaining the selection of the first RF switch output port for the predefined period; (c) receiving a power measurement result indicative that there is no signal in first frequency band; and (d) returning to select the second RF switch output port.

Step 250 may be followed by step 260 of outputting a filtered RF signal from an output of the output RF switch. The filtered RF signal may be provided (directly or via another RF circuit) to an antenna.

The self-controlled RF filtering unit may be without a directional coupler.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it

We claim:

1. A self-controlled radio frequency (RF) filtering unit, comprising:
a frequency bank that comprises first till fourth band pass filters (BPFs) having first till fourth frequency bands respectively; wherein at least one harmonic of at least one fundamental frequency within the first frequency band pass an interference risk for at least one other frequency band;
a measurement circuit configured to measure the input power received in two or more frequency bands and to provide a power measurement result;
an input RF switch comprising a first RF switch input port, a first RF switch output port, and a second RF switch output port; wherein input RF switch is configured to select a selected RF switch output port, based at least in part on the power measurement result, out of the first and second RF switch output ports; wherein the first RF switch output port is RF coupled to an input 2 of the second BPF; wherein the second RF switch output port is RF coupled to inputs of the first BPF, the third BPF and the fourth BPF; and
an output RF switch comprising a second RF switch input port, a third RF switch input port, and a third RF switch output port; wherein output RF switch is configured to select, based at least in part on the power measurement result, a selected RF switch input port out of the second and third RF switch input ports; wherein the second RF switch input port is RF coupled to outputs of the first BPF and the second BPF; and wherein the third RF switch input port is RF coupled to outputs of the third BPF and the fourth BPF.

2. The self-controlled RF filtering unit according to claim 1 wherein the input RF switch is configured to maintaining a selection of the selected RF switch output port for a predefined period.

3. The self-controlled RF filtering unit according to claim 2 wherein the predefined period substantially equals to at least a part of an expected duration of an input RF signal received by the input RF switch.

4. The self-controlled RF filtering unit according to claim 2 wherein the input RF switch is configured to:
select the first RF switch output port;
maintain the selection of the first RF switch output port for the predefined period; receive a power measurement result indicative that there is no signal in first frequency band; and
return to select the second RF switch output port.

5. The self-controlled RF filtering unit according to claim 1 comprising a frequency selective coupler that is RF coupled between the first RF switch input port and the measurement circuit.

6. The self-controlled RF filtering unit according to claim 5 wherein the frequency selective coupler is configured to block frequencies within at least the third and frequency bands.

7. The self-controlled RF filtering unit according to claim 5 wherein the frequency selective coupler is configured to block frequencies above the second frequency band.

8. The self-controlled RF filtering unit according to claim 5 wherein the frequency selective coupler is configured to block frequencies above 1 GHz.

9. The self-controlled RF filtering unit according to claim 5 wherein the frequency selective coupler is a coil.

10. The self-controlled RF filtering unit according to claim 1 wherein the self-controlled RF filtering unit is without a directional coupler.

11. The self-controlled RF filtering unit according to claim 1 wherein the second RF switch output port is RF coupled to inputs of the third BPF and the fourth BPF via a diplexer.

12. The self-controlled RF filtering unit according to claim 1 wherein the third RF switch input port is RF coupled to outputs of the third BPF and the fourth BPF via a matching network that consists essentially of RF transmission lines.

13. The self-controlled RF filtering unit according to claim 12 wherein the RF transmission lines are (a) a first RF transmission line that is RF coupled to the output of the third BPF, and (b) a second RF transmission line that is RF coupled to the output of the fourth BPF.

14. The self-controlled RF filtering unit according to claim 1 wherein at least one of the following is true: (a) the first frequency band ranges between about 430 and 460 MHz, (b) the second frequency band ranges between about 910 and about 930 MHZ, (c) the third frequency band ranges between about 2404 and about 2480 MHz, and (d) the fourth frequency band ranges between about 5725 and about 5850 MHz.

15. A method for self-controlled radio frequency (RF) filtering, the method comprising:
receiving an input RF signal by at least a first RF switch input port of an input RF switch of a self-controller RF filtering unit; wherein the self-controller RF filtering unit comprises a frequency bank that comprises first till fourth band pass filters (BPFs) having first till fourth frequency bands respectively; wherein at least one harmonic of at least one fundamental frequency within the first frequency band pass an interference risk for at least one other frequency band;
measuring, by a measurement circuit of the self-controller RF filtering unit, an input power received in two or more frequency bands, and providing a power measurement result;
selecting, by the input RF switch, a selected RF switch output port out of a first RF switch output port and second RF switch output ports; wherein the selecting is based at least in part on the power measurement result; wherein the first RF switch output port is RF coupled to an input of the second BPF; wherein the second RF switch output port is RF coupled to inputs of the first BPF, the third BPF and the fourth BPF;
applying one or more filtering operations by the filtering bank;
selecting, by an output RF switch, a selected RF switch input port out of a second RF switch input port and third RF switch input port; wherein the selecting is based at least in part on the power measurement result; wherein the second RF switch input port is RF coupled to outputs of the first BPF and the second BPF; and wherein the third RF switch input port is RF coupled to outputs of the third BPF and the fourth BPF.

16. The method according to claim 15 comprising maintaining a selection of the selected RF switch output port for a predefined period.

17. The method according to claim 16 wherein the predefined period substantially equals to at least a part of an expected duration of an input RF signal received by the input RF switch.

18. The method according to claim 16 comprising:
selecting the first RF switch output port;
maintaining the selection of the first RF switch output port for the predefined period;
receiving a power measurement result indicative that there is no signal in first frequency band; and
returning to select the second RF switch output port.

19. The method according to claim 15 comprising performing a frequency selective coupling of the input RF signal to the measurement circuit.

20. The method according to claim 19 wherein the performing of the frequency selective coupling comprising blocking frequencies within at least the third and frequency bands.

21. The method according to claim 19 wherein the performing of the frequency selective coupling comprising blocking frequencies above the second frequency band.

22. The method according to claim 19 wherein the performing of the frequency selective coupling comprising blocking frequencies above 1 GHz.

23. The method according to claim 19 wherein the performing of the frequency selective coupling is performed using a frequency selective coupler that comprises a coil.

24. The method according to claim 15 wherein the self-controlled RF filtering unit is without a directional coupler.

25. The method according to claim 15 wherein the second RF switch output port is RF coupled to inputs of the third BPF and the fourth BPF via a diplexer.

26. The method according to claim 15 wherein the third RF switch input port is RF coupled to outputs of the third BPF and the fourth BPF via a matching network that consists essentially of RF transmission lines.

27. The method according to claim 26 wherein the RF transmission lines are (a) a first RF transmission line that is RF coupled to the output of the third BPF, and (b) a second RF transmission line that is RF coupled to the output of the fourth BPF.

28. The method according to claim 15 wherein at least one of the following is true: (a) the first frequency band ranges between about 430 and 460 MHz, (b) the second frequency band ranges between about 910 and about 930 MHZ, (c) the third frequency band ranges between about 2404 and about 2480 MHz, and (d) the fourth frequency band ranges between about 5725 and about 5850 MHz.

* * * * *